INVENTOR
Clarence A. Flarsheim

BY Schmidt, Johnson, Hovey,
Williams & Bradley
ATTORNEYS

United States Patent Office 3,546,930
Patented Dec. 15, 1970

3,546,930
ROTARY TO LINEAR MOTION DEVICE
WITH AUTOMATIC RETURN
Clarence A. Flarsheim, 6131 Mission Drive,
Shawnee Mission, Kans. 66208
Filed Nov. 25, 1968, Ser. No. 778,397
Int. Cl. F16h 25/12
U.S. Cl. 74—89.15        5 Claims

ABSTRACT OF THE DISCLOSURE

A rotary to linear motion device utilizing the ball screw principle and having a rotatable member with a groove formed therein, said member being driven and a linear motion member having a surface adjacent the groove of the rotatable member, there being a shiftable ball carried by the linear motion member for selective engagement with said groove whereby the rotary motion of said rotatable member is transformed into linear motion and the linear motion member caused to reciprocate through a predetermined path, the linear motion member being driven in one direction and automatically returned in the other direction by virtue of actuation of a coupling assembly which shifts said ball into and out of said groove.

It is the most important object of this invention to provide a rotary to linear motion device in the nature of reciprocating mechanism which includes a rotating member having a linear motion member coupled therewith by virtue of the engagement of a ball which is carried by the linear motion member into a groove formed in the rotating member, there being a coupling assembly for selectively shifting the ball into and out of said groove whereby the linear motion member may be driven in one direction and the ball then automatically disengaged from the groove whereby to permit the automatic return of the linear motion member.

It is yet another important object of this invention to provide a coupling assembly for selectively shifting the ball into and out of the groove of the rotary member, the coupling assembly being carried by the linear motion member. The coupling assembly includes structure for retaining the ball within an opening which is formed in the linear motion member, said structure including a reciprocable cam bar which is in engagement with the ball whereby to shift the ball through the opening to a point of engagement with the groove whereby to couple the rotary member and the linear motion member, the cam bar being shiftable by suitable actuating means whereby to permit the ball to disengage from the groove and thereby permit return of the linear motion device to its initial position.

Another important object of this invention is to provide actuating means for the coupling assembly, these being in the form of a cam adjustably positioned at one end of the rotary member for reciprocating the cam bar to a position to shift said ball into the groove, and a stop adjacent the other end of the rotary member to reciprocate said cam bar in such a manner as to permit the ball to move out of the groove and thereby to cause return, under gravity or other means, of the linear motion member to its initial position whereupon the ball is again moved into the groove to cause the linear motion member to be driven to the end of its predetermined path of travel.

It is yet another object of this invention to provide a rotary to linear motion device with automatic return which utilizes the ball screw principle, and wherein the screw, if inadvertently rotated in the wrong direction, will not become jammed, and wherein the device is self-releasing in case it is either overloaded or rotated in the wrong direction. Also, the device is provided with adjustable biasing means whereby the pressure of the cam bar upon the ball may be regulated to thereby adjust the optimum pressure at which the device will be operable, said biasing means also serving to automatically compensate for wear on the ball and the screw.

Other objects of this invention will become apparent from the following specification and accompanying drawing, wherein.

Figure 1:
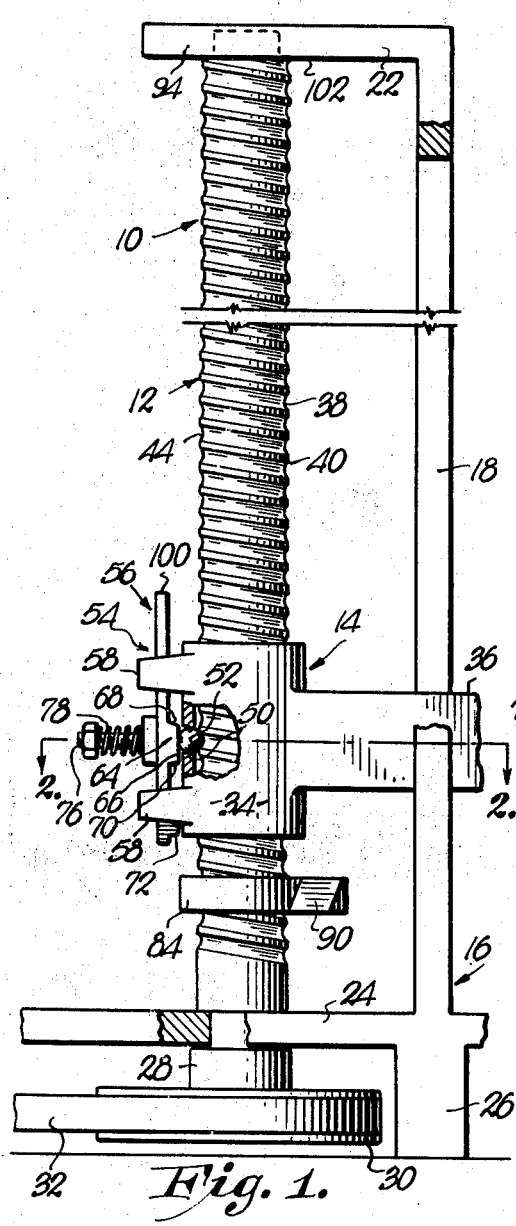
FIG. 1 is a fragmentary, side elevational view, with parts in section, showing the device with the ball in the groove.

This invention represents an improvement over that of my U.S. Pat. No. 3,334,526, issued Aug. 8, 1967, and entitled "Reciprocating Mechanism."

In the present, improved form of the invention, the rotary to linear motion device in the nature of a reciprocating mechanism is greatly simplified, particularly in the manner in which the linear motion member is selectively coupled with the rotary member to cause the driving of the linear motion member in a linear path.

In the rotary to linear motion device with automatic return, designated by the numeral 10, there is provided one member 12, which is the rotary or rotating member, and another member 14 which is the linear motion member and which moves in a predetermined linear path upon being driven by rotary member 12.

In the embodiment of the invention chosen for illustration, there is provided a support, generally designated as 16, which serves to carry the device 10, said support including as its primary components an upright member 18 having a slot 20 formed substantially centrally thereof and extending the full length of upright 18. A lateral extension 22 is positioned adjacent the uppermost end of support 16, as shown in the drawing, said lateral extension 22 having suitable bearing means for receiving an end of rotary member 12 and also having a portion which serves as a stop in a manner which will be hereinafter described. A similar lateral extension 24 is provided adjacent the lower end of support 16 and likewise receives an end of member 12, there being a suitable bearing provided for said end of member 12. Support 16 is coupled with additional suitable structure (not fully shown) in the nature of a base 26 whereby said device 10 may be supported in an upright position as shown in the drawing, although it will be appreciated that, with minor modifications, device 10 may be disposed in a horizontal position and operated in a manner to be hereinafter described. The lowermost end 28 of member 12 has attached thereto a pulley 30 driven by a belt 32 whereby rotary motion may be imparted to the member 12 from a suitable power source (not shown) which is coupled therewith by belt 32 and pulley 30, it being contemplated that, in the device chosen for illustration, the member 12 will be rotated in a counterclockwise direction viewing FIG. 2 of the drawing.

The linear motion member 14 is in the nature of a sleeve 34 which is disposed in circumscribing relationship to the member 12, the sleeve 34 having suitable supporting structure such as an arm 36 extending laterally therefrom and through slot 20, said arm 36 being coupled with whatever object is to be transported by the device 10 when the same is placed in operation.

The member 12 has a continuous spiral groove 38 formed in the exterior surface thereof and defined by a continuous spiral ridge 40, said groove being of any desired pitch, depending upon the particular function to be performed by the device 10 and being either left-hand or right-hand, again depending upon the environment in which the device is to be utilized, it being noted that the groove 38 in the embodiment chosen for illustration is left-hand.

The linear motion member 14 presents an inner surface 42 which is adjacent the outer surface 44 of member 12, said groove 38 being formed in the surface 44. An opening 46 is formed through the wall 48 of sleeve 34, the opening 46 having a lip 50 at the edge thereof proximal to surface 44 of member 12. A ball 52 is positioned within said opening 46 in such a manner that it may be shifted into and out of the groove 38 in a manner hereinafter described.

In order to interconnect member 12 with member 14 there is provided a coupling assembly, broadly designated by the numeral 54, the coupling assembly including structure for shifting the ball 52 into and out of the groove 38. Such structure includes a reciprocable slide cam bar 56 which is carried between two spaced-apart pairs of guides 58 which are formed as a part of the sleeve 34 and extend outwardly therefrom whereby to define the path of reciprocable movement of the slide cam bar 56.

Cam bar 56 has a rear face 60 which is planar, and a front face 62 which has formed, centrally thereof, a camming extension 64, said camming extension 64 including a flat face 66, and a shoulder 68, as well as a lowermost stop shoulder 70. Also carried by slide cam bar 56 is a lug 72 which extends from the front face 62 thereof in the same direction as camming extension 64.

Figure 2:
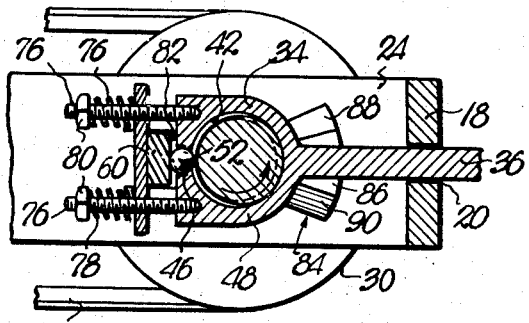
FIG. 2 is a sectional view taken along line 2—2 of FIG. 1.

Slide cam bar 56 is retained in its position as a part of the coupling assembly 54 by guides 58 and by means of a biasing strap 74 which is in engagement with the rear face 60 of cam bar 56, strap 74 transversely traversing said face 60 and being retained in position with respect thereto by a pair of threaded rods 76 which are received within the sleeve 34, as shown in FIG. 2, each of said rods 76 carrying a biasing spring 78, said springs 78 each being disposed between a corresponding nut 80 and the face of strap 74 opposite to that which is in engagement with slide cam bar 56, all to the end that slide cam bar 56 is urged toward the sleeve 34 of linear motion member 14. As is apparent, the pressure exerted by strap 74 upon the slide cam bar 56 and thus upon the ball 52, may be adjusted and regulated as by shifting the nuts 80 along their corresponding threaded rods 76 to thereby adjust the compression of springs 78.

Figures 3, 5:
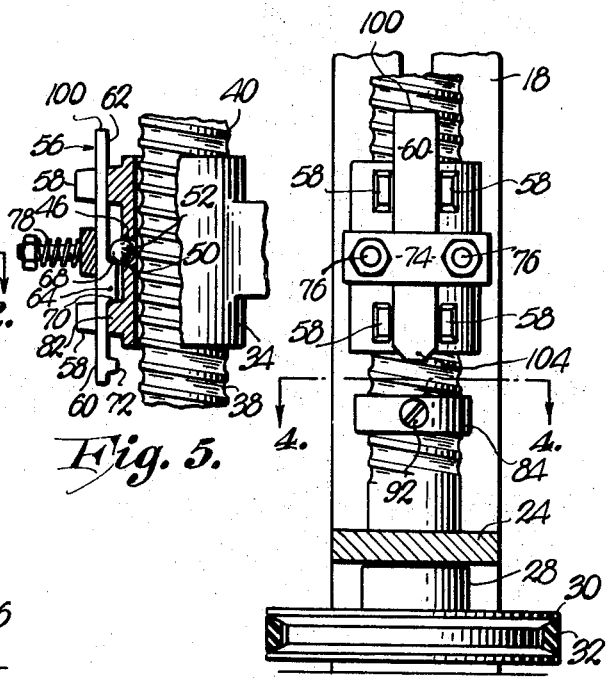
FIG. 3 is a fragmentary, end elevational view of the device.
FIG. 5 is a fragmentary, side elevational view, with parts in section, corresponding to FIG. 1 but showing the ball out of the groove.

The cam bar 56 is shiftable between the position shown in FIG. 1 of the drawing where the ball 52 is shifted into the groove 38 and the position shown in FIG. 5 of the drawing where the ball 52 is permitted to shift out of the groove 38, the ball then being engaged by front face 62 and shoulder 68 and retained partially within the opening 46 but yet out of engagement with any part of surface 44 of rotary member 12. It will be noted that upward movement of cam bar 56 is limited by stop lug 72, which lug 72, as cam bar 56 is reciprocated upwardly, engages the lower surface of an extension 82 of sleeve 34 which is disposed between the lower guide arms 58. Likewise, downward movement of cam bar 56 is limited by virtue of engagement of stop shoulder 70 with the upper surface of the extension 82, all as is clearly shown in FIG. 5 of the drawing. Thus, cam bar 56 is at all times retained in its relative position with respect to linear motion member 14 but is actuated in a rectilinear path to thereby act upon the ball 52.

Figure 4:
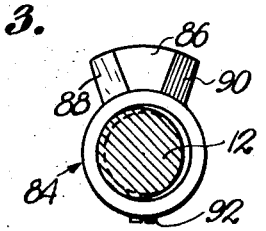
FIG. 4 is a sectional view taken along line 4—4 of FIG. 3.

The actuating means for the coupling assembly 54, and more particularly slide cam bar 56, are located at opposed ends of the rotary member 12, there being a cam collar 84 disposed adjacent one end of member 12, said cam collar including an extension 86 having a pair of oppositely disposed, inclined camming surfaces 88 and 90, all as is best shown in FIG. 4 of the drawing. Cam collar 84 is in surrounding relationship to member 12 and is secured to member 12 for rotation therewith by a setscrew 92, it being apparent that setscrew 92 may be loosened and cam collar 84 shifted longitudinally of member 12 whereby to locate collar 84 at any desired location along member 12.

Figure 6:
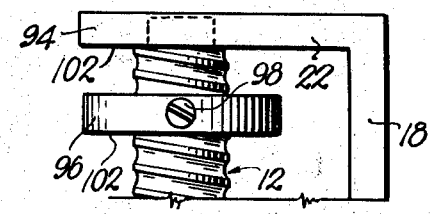
FIG. 6 is a fragmentary elevational view of the upper end of the device showing the stop adjusted to another position on the rotary member.

A portion of extension 22 defines a stop 94, which could be similar in configuration to cam collar 84, said stop 94 more particularly constituting that portion of extension 22 which is in immediate surrounding relationship to the opposite end of member 12. Stop 94 may be formed as a part of extension 22, such as just described and as shown in FIG. 1 of the drawing, or may constitute a separate stop member such as 96 as shown in FIG. 6 of the drawing and which is adjustable longitudinally with respect to the member 12 as by a setscrew 98 which may be loosened to move stop member 96 axially of member 12. With the adjustable stop member 96, said stop member 96 and the cam collar 84 may each be positioned at desired predetermined locations on members 12 to thereby define therebetween the extent of linear movement of member 14 and, therefore, the extent of movement of the device carried by arm 36 may be determined and regulated through the utilization of the adjustable cam collar 84 and stop member 96. In the form of invention illustrated in FIG. 1, the extent of linear movement of member 14 can still be determined by adjusting cam collar 84 with respect to fixed stop 94.

Said collar 84 and the stop 94 or the stop member 96, whichever form is utilized, serve to actuate the cam bar 56 and to reciprocate the same in the desired direction to permit continuous operation of the device 10. For instance, when the cam bar 56 is in a raised position, as shown in FIG. 1 of the drawing, member 14 is then coupled with member 12 through the engagement of ball 52 with groove 38. When so coupled, rotation of member 12 will cause the ball 52 to follow groove 38 and thereby move the entire member 14 in a linear path of travel upwardly viewing FIG. 1.

When linear motion member 14 has reached the desired limit of its path of travel, the extending end edge 100 of cam bar 56 will engage the lower face 102 of either stop 94 or stop member 96 and, inasmuch as the member 14 is being driven toward face 102, such engagement will cause the slide cam bar 56 to be reciprocated to the position shown in FIG. 5 of the drawing where said cam bar is moved downwardly to bring stop shoulder 70 into engagement with the upper face of extension 82. When this is accomplished, the ball 52 is permitted to shift out of groove 38 and toward front face 62 and shoulder 68 of cam bar 56, said face and shoulder serving to retain the ball 52 partially within the opening 46. It is to be noted that such retention of the ball 52 within the opening 46 does not permit the ball to move entirely out of the opening 46 but rather retains the same sufficiently within said opening that it may be cammed in the opposite direction when such is desired without hanging up on the outer edge of the outer opening 46.

When the ball is shifted out of groove 38 the member 14 is no longer coupled with the member 12 and by virtue of the weight thereof will return to its starting position. During such return linear movement there is sliding engagement between the inner surface 42 of sleeve 34 and the outer surface 44 of member 12 whereby to permit rapid and automatic return of the member 14 to its predetermined starting position. Such starting position is determined by the placement of cam collar 84 on member 12 for, when said member 14 moves downwardly under gravity, the lower end 104 of cam bar 56, which is tapered as shown in FIG. 3, will be engaged by camming surface 88 of cam collar 84, shown in FIG. 2, said lower end 104 riding upon the inclined surface 88 as it rotates and thereby causing upwardly shifting movement of cam bar 56 inasmuch as member 14 is held against rotation by virtue of arm 36 which extends through slot 20 in fixed upright member 18. Such actuation of the cam bar again moves the ball 52 through opening 46 and into engagement with groove 38, thereby coupling member 14 with member 12, which member 12 has been continuously rotating. When the ball 52 is again shifted into groove 38, the member 14 will be moved through its predetermined path of linear motion until such time as cam bar 56 is again moved into engagement with stop 94 or a stop member such as 96 and, when this occurs, cam bar 56 will be reciprocated downwardly viewing the drawing, to the position shown in FIG. 5, thereby permitting member 14 to move to its starting position where the cam bar 56 is again shifted upwardly to recouple member 14 with member 12 and thus carry on the cycle of conitnuous operation.

In the embodiment chosen for illustration and description, it is intended that the member 12 be provided with a left-hand spiral groove 38 and be driven in such a manner as to rotate in a counterclockwise direction viewing FIG. 2 of the drawing, whereby, when member 14 moves downwardly, the end 104 of cam bar 56 will be engaged by inclined surface 88 of extension 86. The other inclined surface 90 of extension 86 is provided in order to prevent jamming of the device 10 should member 12 be inadvertently rotated in a clockwise direction. If such clockwise rotation were to occur, the lower end 104 of bar 56 would be engaged by surface 90 whereby to reciprocate cam bar 56 to a raised position, thereby permitting the lower end 104 thereof to clear the upper face of extension 86, such reciprocation also shifting ball 52 into groove 38. By virtue of such reciprocation of cam bar 56 by inclined surface 90, and during continued clockwise rotation, sleeve 34 is restrained by collar 84 from moving further downwardly and sleeve 34 is relieved from locking engagement with member 12 by virtue of the ball 52 riding out of the groove 38 against the bar 56, forcing the biasing strap 74 to raise against the pressure of springs 78 and thereby permit the ball 52 to ride over the ridge 40.

Thus there is presented a rotary to linear motion device of simplified construction and involving only a minimum of movable parts, said parts being relatively shiftable in such a manner as to cause the linear motion device to continually move in a predetermined path of travel so long as there is relative motion between the parts. It is, of course, apparent that any suitable object may be coupled with arm 36 and be driven in the desired path of travel through operation of device 10. Likewise, it is apparent that a plurality of such devices 10 may be utilized and coupled to provide positive motion in both directions and that the same could be disposed in either a vertical position, as shown, or in a horizontal or inclined position. If disposed in a horizontal or inclined position, the automatic return can be effected through the utilization of a suitable return mechanism coupled to member 14 rather than relying upon the force of gravity as hereinabove described with respect ot the embodiment of this invention chosen for illustration.

Having thus described the invention, what is claimed as new and desired to be secured by Letters Patent is:

1. In a rotary to linear motion device;
a pair of relatively movable members, one of said members being rotatable relative to the other member and having a surface adjacent to said other member, said surface having a spiral groove;
a ball shiftably carried by said other member and receivable within said groove for coupling said other member with said one member to thereby cause movement of said other member in a linear path as said one member is rotated;
means for causing shifting of said ball into and out of said groove to cause movement of said other member a predetermined distance in one direction in a linear path and to permit return of said other member in an opposite direction, said means for causing shifting of the ball including a coupling assembly carried by said other member; and
means for actuating said coupling assembly, said actuating means including a cam adjacent one end of said one member for actuating said coupling assembly to shift said ball into said groove and a stop adjacent the other end of said one member for actuating said coupling assembly to permit shifting of said ball out of said groove.

2. In a rotary to linear motion device as set forth in claim 1, said cam and said stop being adjustable with respect to said one member to thereby determine the length of the linear path of travel of said other member.

3. In a rotary to linear motion device:
a pair of relatively movable members, one of said members being rotatable relative to the other member and having a surface adjacent to said other member, said surface having a spiral groove;
a ball shiftably carried by said other member and receivable within said groove for coupling said other member with said one member to thereby cause movement of said other member in a linear path as said one member is rotated; and
means for causing shifting of said ball into and out of said groove to cause movement of said other member a predetermined distance in one direction in a linear path and to permit return of said other member in an opposite direction, said means for causing shifting of the ball including a coupling assembly carried by said other member, said coupling assembly including a structure for shifting said ball toward said one member, said structure including a reciprocable cam bar, said ball being in engagement with said bar, there being an opening formed in said other member in opposed relationship to said cam bar, said bar retaining said ball in said opening.

4. In a rotary to linear motion device as set forth in claim 3, there being a biasing assembly carried by said other member for adjustably urging said cam bar into retaining engagement with said ball.

5. In a rotary to linear motion device as set forth in claim 4, there being a shoulder on said cam bar for limiting the shifting movement of said ball as it moves out of said groove and to retain said ball partially within said opening when the ball is out of the groove.

References Cited

UNITED STATES PATENTS

| | | | |
|---|---|---|---|
| 28,613 | 6/1860 | Spencer | 74—459 |
| 2,369,910 | 2/1945 | Morgan | 74—89.15 |
| 2,571,189 | 10/1951 | Bersche | 74—459 |

WESLEY S. RATLIFF, Jr., Primary Examiner

U.S. Cl. X.R.

74—459